US009630361B2

(12) United States Patent
Scheu et al.

(10) Patent No.: US 9,630,361 B2
(45) Date of Patent: Apr. 25, 2017

(54) METHOD AND APPARATUS FOR PUNCHING AND CONNECTING PLASTIC PARTS

(71) Applicant: MS Spaichingen GmbH, Spaichingen (DE)

(72) Inventors: Jochen Scheu, Villingen-Schwennigen (DE); Thomas Baumeister, Aldingen (DE); Volker Krell, Neuhausen ob Eck (DE)

(73) Assignee: MS ULTRASCHALL TECHNOLOGIE GMBH, Spaichingen (DE)

( * ) Notice: Subject to any disclaimer, the term of this patent is extended or adjusted under 35 U.S.C. 154(b) by 15 days.

(21) Appl. No.: 14/542,008

(22) Filed: Nov. 14, 2014

(65) Prior Publication Data

US 2015/0136307 A1    May 21, 2015

(30) Foreign Application Priority Data

Nov. 15, 2013  (DE) ........................ 10 2013 223 379

(51) Int. Cl.
    *B32B 37/00*    (2006.01)
    *B29C 65/74*    (2006.01)
    (Continued)

(52) U.S. Cl.
CPC ........... *B29C 65/745* (2013.01); *B29C 65/08* (2013.01); *B29C 65/081* (2013.01); *B29C 65/749* (2013.01); *B29C 65/7451* (2013.01); *B29C 65/7457* (2013.01); *B29C 66/112* (2013.01); *B29C 66/131* (2013.01); *B29C 66/301* (2013.01); *B29C 66/53245* (2013.01); *B29C 66/61* (2013.01); *B29C 66/81431* (2013.01); *B29C 66/81463* (2013.01); *B29C 66/83221* (2013.01); *B29C 66/847* (2013.01); *B29L 2031/3044* (2013.01); *Y10T 156/12* (2015.01)

(58) Field of Classification Search
CPC ........... B29C 65/745; B29C 65/07451; B29C 65/07457; B29C 65/0749; B29C 65/08; B29C 65/081; B29C 66/112; B29C 66/131; B29C 66/301; B29C 66/53245; B29C 66/61; B29C 66/81431; B29C 66/81463; B29C 66/83221; B29C 66/847; B29C 65/7451; B29C 65/7457; B29C 65/749
USPC ........ 156/73.1, 73.3, 250, 261, 580.1, 580.2
See application file for complete search history.

(56) References Cited

U.S. PATENT DOCUMENTS 3,884,738 A * 5/1975 Hofius, Sr. ............. A41H 37/06
                                                                156/256
5,480,501 A * 1/1996 Stewart ................... B29C 65/08
                                                                156/293

(Continued)

FOREIGN PATENT DOCUMENTS

DE    10 2006 020 418 A1    10/2007
DE    10 2011 104 840 A1    12/2012

(Continued)

*Primary Examiner* — James Sells
(74) *Attorney, Agent, or Firm* — Vivacqua Law, PLLC; Raymond J. Vivavqua; Steven L. Crane

(57) ABSTRACT

A top tool and a bottom tool which can be set relative to one another along an axis perpendicular to a workpiece plane are provided in an apparatus for punching and welding plastic parts. A punch die and a sonotrode are fastened to one of the tools.

17 Claims, 5 Drawing Sheets

Figure 1:
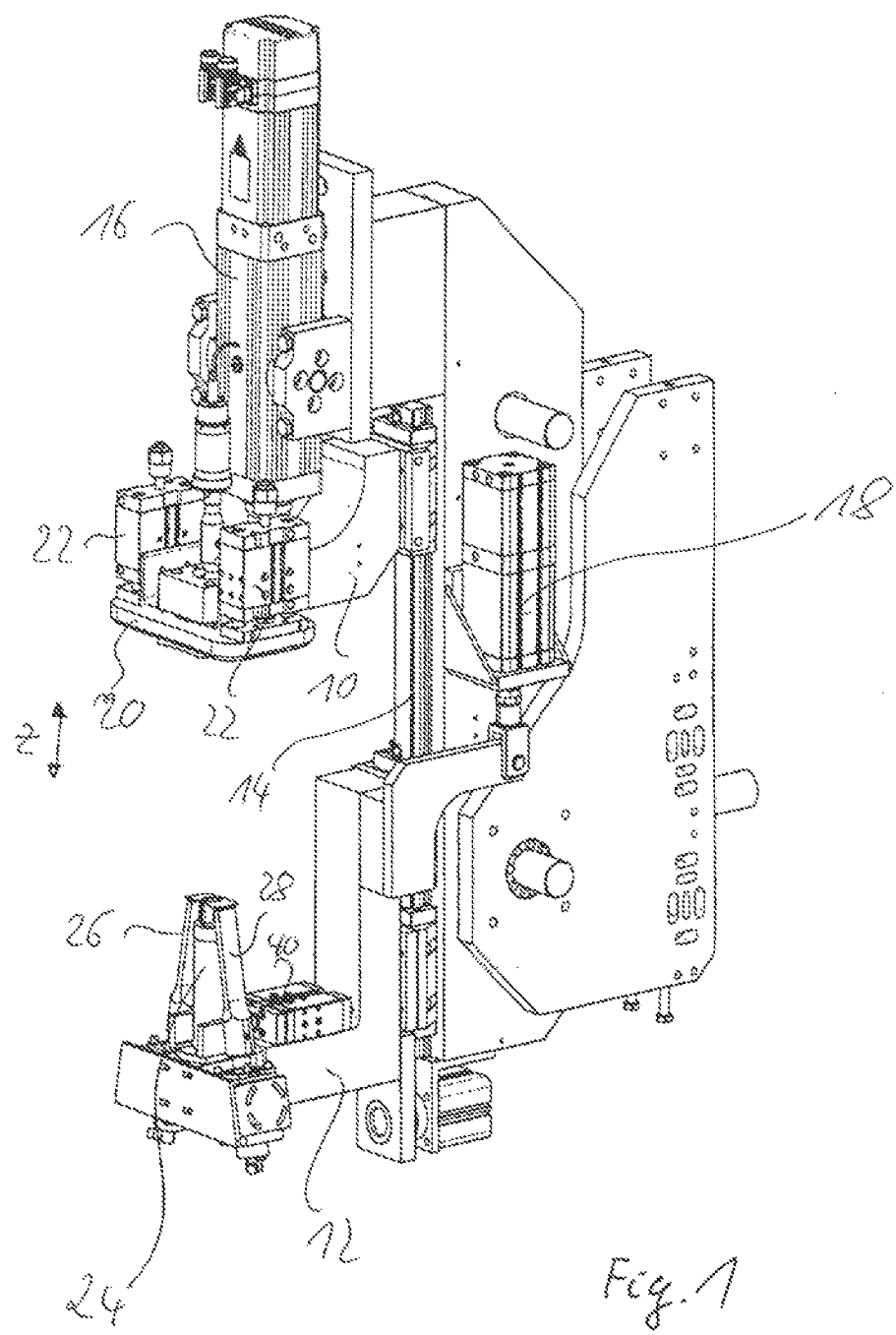

(51) Int. Cl.
   *B29C 65/08*   (2006.01)
   *B29C 65/00*   (2006.01)
   B29L 31/30    (2006.01)

(56) References Cited

U.S. PATENT DOCUMENTS

| | | |
|---|---|---|
| 6,309,490 B1 | 10/2001 | Davis |
| 7,469,455 B2 | 12/2008 | Distel |
| 7,959,054 B2 | 6/2011 | Konieczka |

FOREIGN PATENT DOCUMENTS

| | | |
|---|---|---|
| DE | 20 2010 014 913 U1 | 3/2013 |
| EP | 1 798 019 A1 | 6/2007 |
| EP | 1 849 583 A2 | 10/2007 |
| GB | 2 320 906 A | 7/1998 |
| JP | S61 74825 A | 4/1986 |
| WO | 2011/117550 A1 | 9/2011 |

* cited by examiner

METHOD AND APPARATUS FOR PUNCHING AND CONNECTING PLASTIC PARTS

The present invention relates to an apparatus for punching and connecting, in particular welding, of plastic parts, in particular plastic parts for motor vehicles, comprising a top tool and a bottom tool which can be set relative to one another along an axis perpendicular to a workpiece plane and comprising at least one punch die and at least one sonotrode which are both attached either to the top tool or to the bottom tool. The sonotrode can be replaced by a tool suitable for adhesive bonding for a connection by means of adhesive bonding. In the following, however, for reasons of simplicity, only a connection by welding will be described, with the invention, however, also covering a connection by adhesive bonding.

The above-described apparatus are known from the prior art and serve to introduce openings into workpieces and to fasten or to weld further workpieces in the region of the opening. For example, openings for sensors can be introduced into bumpers using such apparatus, with an adapter being able to be welded in the region of the opening for the fastening of the sensor.

The aim with the apparatus of the category is that the main workpiece, i.e. e.g. the bumper, does not have to be moved between the worksteps. Furthermore, the footprint of such an apparatus should be as small as possible. In addition, the construction space for individual components of the apparatus is greatly restricted due to the design of bumpers typically in U shape in cross-section.

Apparatus of the category are known from the prior art (EP-A-1 798 019) in which the punch die is moved via a carriage on a slanted plane relative to the punching direction. This limits the application possibilities due to the high space requirement for the displacement of the punch die. The same applies to apparatus in which the punch die is pivoted, for example.

It is the object of the present invention to further develop an apparatus for punching and welding plastic parts in accordance with the preamble of claim 1 such that the space requirement for the punch die and the sonotrode within the apparatus is minimized.

This object is satisfied in accordance with a first aspect of the invention in an apparatus in accordance with the preamble of claim 1 in that the sonotrode is rigidly fastened to the tool and in that the punch die is fastened to the tool via a lifting device by which the punch die can only be adjusted relative to the sonotrode in the direction of the axis, i.e. substantially perpendicular to the workpiece plane.

The punch die can be raised relative to the tool for punching using this solution in accordance with the invention so that no damage to the sonotrode occurs during the punching process. The lifting device can then be actuated for the welding so that the punch die can be moved back in the direction of the tool, whereupon the welding process can take place. It can be advantageous in this respect if the punch die is only pressed lightly onto the main workpiece in order to hold the workpiece to be welded, for example an adapter, properly at the welding position.

Advantageous embodiments of the invention are described in the description, in the drawing and in the dependent claims.

In accordance with a first advantageous embodiment, the lifting device can be latched to the tool via a latch so that the punching force is only applied to the punch die and from this onto the tool, but not onto the sonotrode. It can be advantageous in this connection if the punch die is provided with at least one cut-out or a projection with which the latch can establish a shape-matched connection.

In accordance with a further advantageous embodiment, the punch die can be provided, in particular also in one piece, with a piston which is guided in a cylinder which is fastened to the tool or is part of the tool. A particularly compact construction can be achieved in this manner and the sonotrode or the sonotrodes can be arranged particularly close to the punch die to create an arrangement with a compact construction space.

In accordance with a further aspect of the invention, it relates to an apparatus of the type of the category, wherein the punch die is rigidly fastened to the tool and the sonotrode is fastened to the tool via a lifting device by which the sonotrode can be adjusted relative to the punch die only in the direction of the axis.

In this embodiment, the punch die is rigidly coupled to the tool so that a latch or the like can be dispensed with. The sonotrode is, however, displaceable relative to the workpiece plane, i.e. relative to the main workpiece, so that the sonotrode can be moved somewhat out of the workpiece plane during the punching process or can be moved relative to the bottom tool for welding. The apparatus can also be of a construction with a very small space requirement of the individual components in this embodiment so that a combined welding and punching tool can also be arranged in an angled side region of a bumper within the bumper, for example, and the processing can take place with said combined welding and punching tool without the main workpiece having to be moved.

In accordance with an advantageous embodiment, a converter of the sonotrode can be fastened to a piston which is a component of the lifting device. The required space is minimized in this manner since the (generally cylindrical) converter so-to-say serves as a piston.

In accordance with a further aspect of the invention, it relates to an apparatus of the type of the category, wherein the sonotrode is rigidly fastened to the tool and the punch die is rigidly fastened to the sonotrode or to the tool. In this case, there is a relative movement of neither the sonotrode nor the punch die. These two components are rather adjusted in their relative positions such that the welding or the punching can take place directly after the punching or after the welding without these components having to be moved again.

In accordance with an advantageous embodiment, the sonotrode can be substantially cylindrical, wherein the punch die is arranged in the interior of the sonotrode and is guided to the outside via openings in the sonotrode. The sonotrode can oscillate freely in this manner, on the one hand, and the punching forces can be taken up from the tool by the punch die led out of the sonotrode, on the other hand.

In accordance with a further advantageous embodiment, the sonotrode and the punch die can be connected to one another in one piece. Provided that the tolerances of the components to be welded make it necessary, however, the sonotrode and the punch die can also be movably, i.e. adjustably, connected to one another or can be adjustably fastened relative to one another at the tool.

In accordance with a further aspect, the invention relates to a method for punching and welding at least two plastic parts, in particular using an apparatus of the above-described kind, wherein the described plastic parts are first welded to one another by a sonotrode and wherein after the welding at least one of the plastic parts is subsequently punched through in one and the same apparatus.

In this method in accordance with the invention, the sequence which is known from the prior art, which is typical and in which first punching and then welding takes place, is exactly reversed. The great advantage results from this that, on the one hand, both components are already welded to one another during the punching process so that no relative displacement can occur here. On the other hand, the welding process can be carried out so that a throughgoing weld connection with material continuity is provided in the region of the (later) punched hole. It is also advantageous here if the two plastic parts do not have to be moved relative to the processing tool during the processing.

The present invention will be described in the following purely by way of example with reference to advantageous embodiments and to the enclosed drawings.

Figure 2:
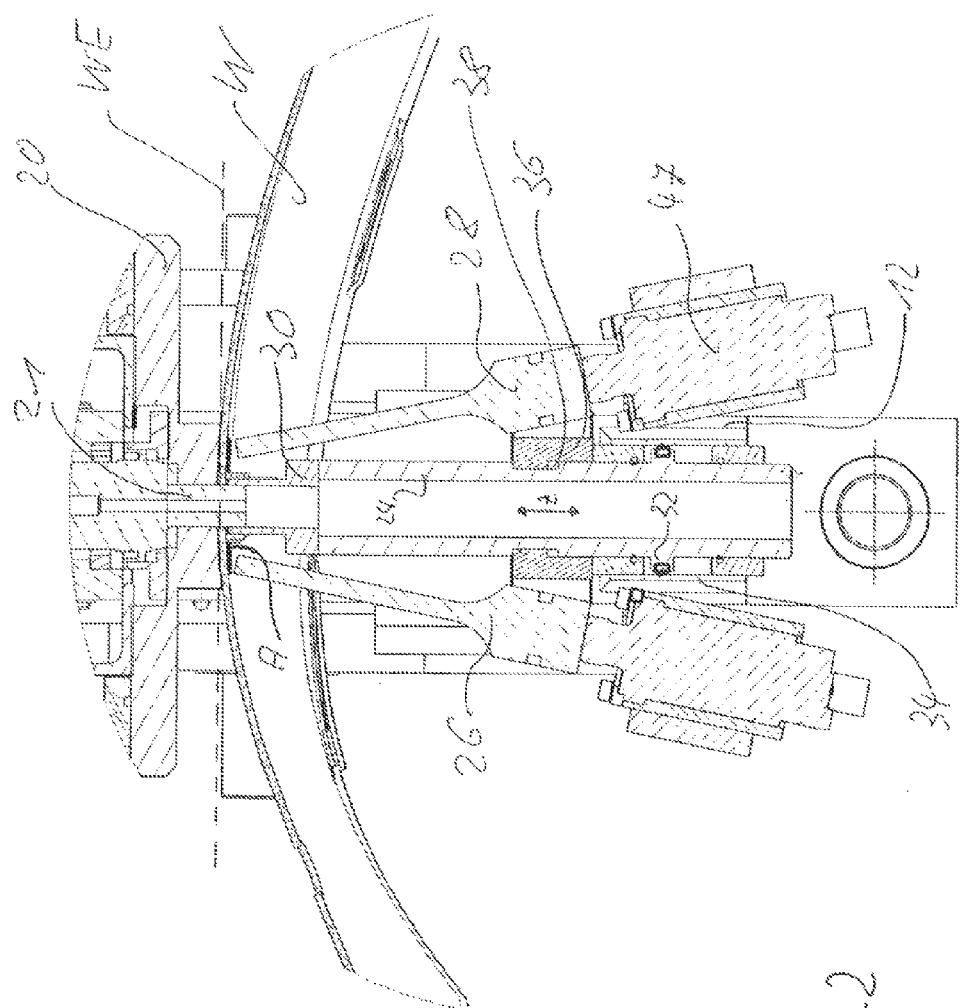
Figure 3:
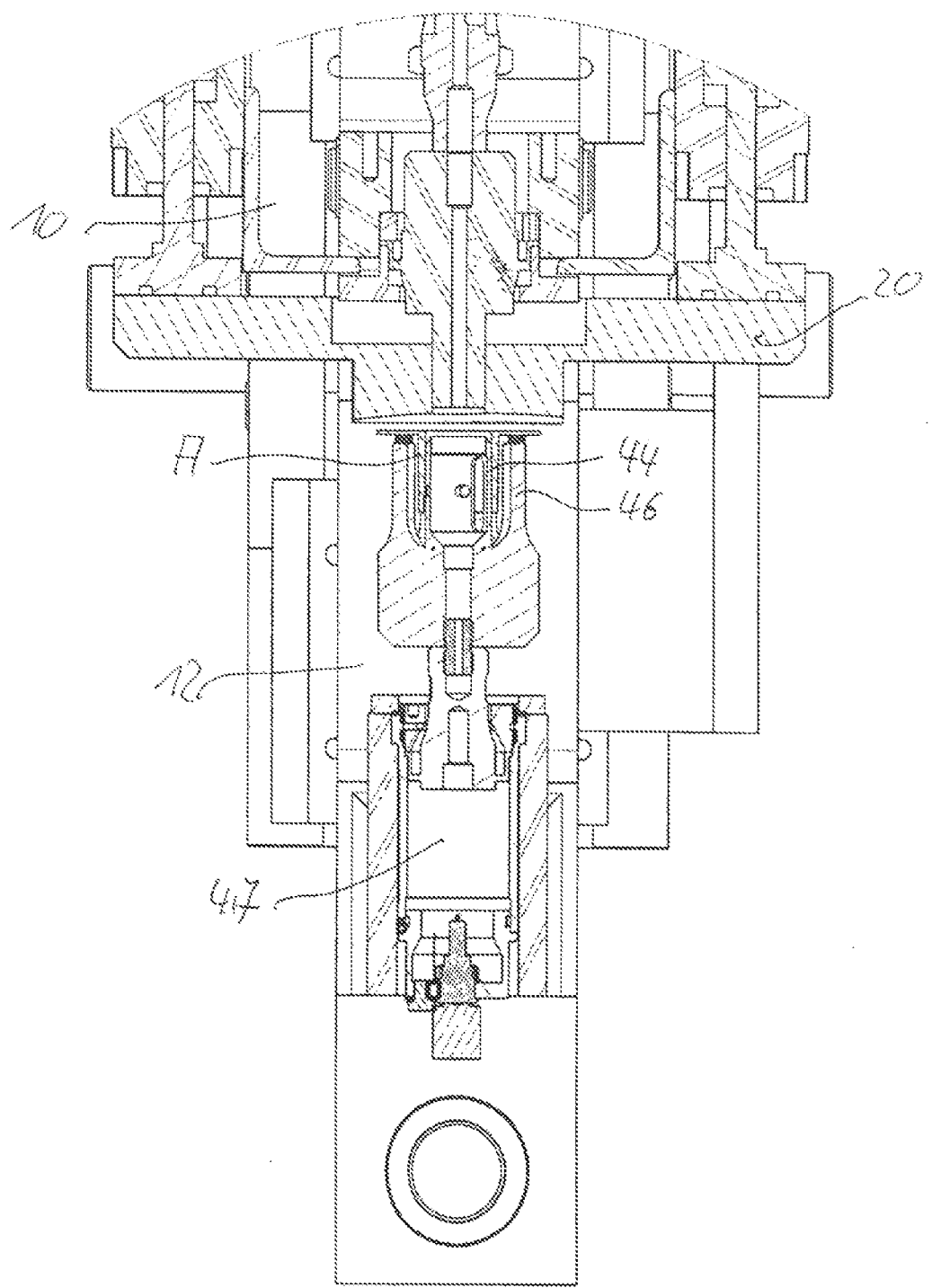
Figure 4:
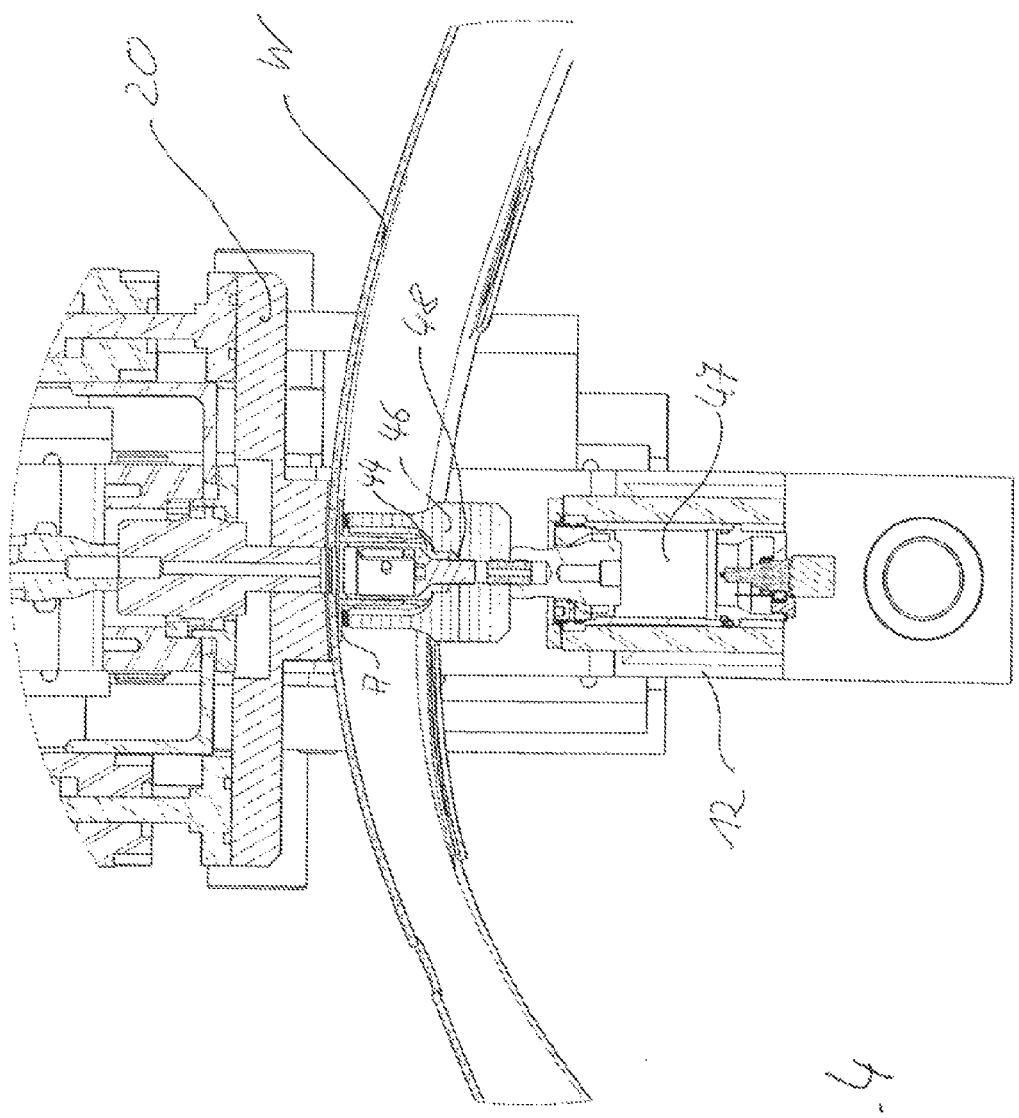
Figure 5:
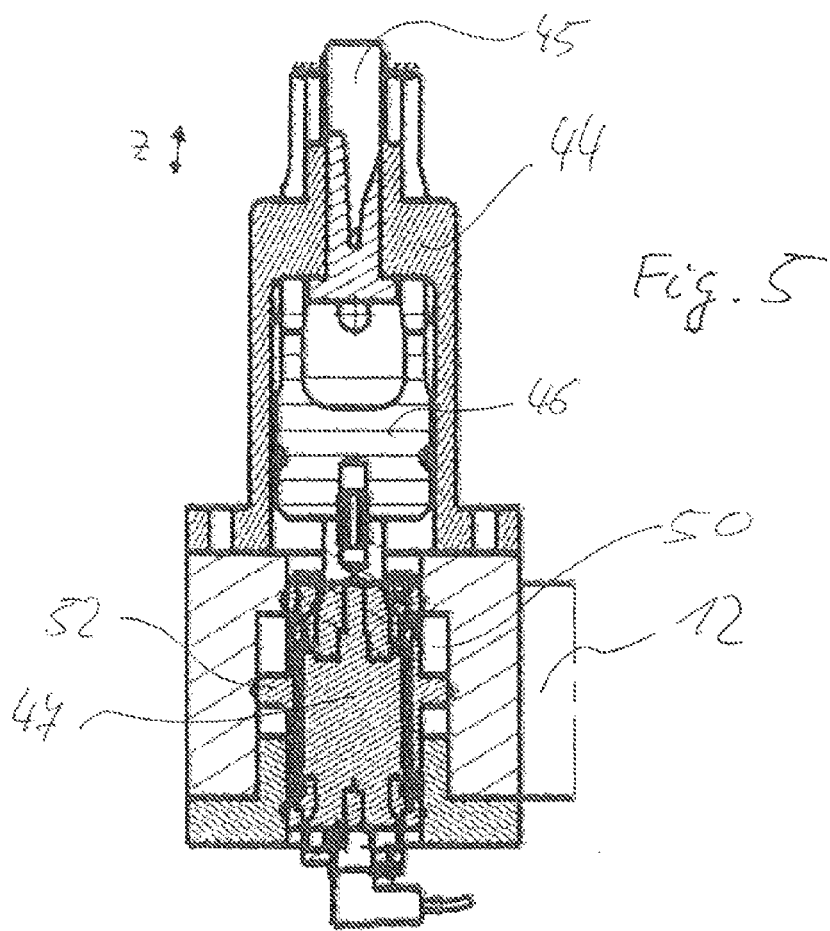

There are shown:

FIG. 1 a perspective view of a first embodiment;

FIG. 2 an enlarged cross-sectional view of a part of the apparatus of FIG. 1;

FIG. 3 a cross-sectional view of a further embodiment;

FIG. 4 a cross-sectional view of a further embodiment;

FIG. 5 a cross-sectional view of a further embodiment; and

Figure 6:
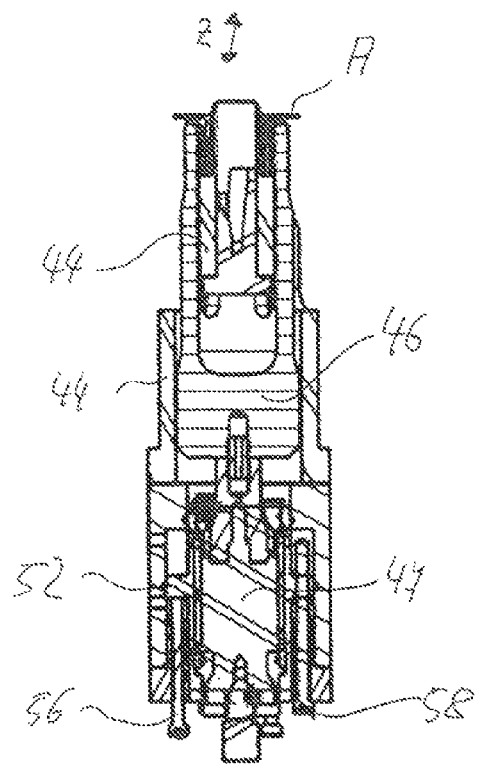

FIG. 6 a cross-sectional view of a further embodiment of the invention.

FIG. 1 shows a perspective view of an apparatus for punching and welding plastic parts, for example for welding an adapter to a bumper and for introducing a punched hole into the bumper or into the bumper and the adapter.

The apparatus has a top tool 10 and a bottom tool 12 which can be set relative to one another substantially perpendicular to a workpiece plane WE (FIG. 2) in the direction of the double arrow z. As can be recognized, both tools 10 and 12 can be moved toward one another and away from one another along a linear guide 14 in the direction z, wherein a positioning cylinder 16 is provided for displacing the top tool 10 and a positioning cylinder 18 is provided for displacing the bottom tool 12.

A generally C-shaped stamping frame results overall due to this arrangement, wherein a plurality of these stamping frames are arranged next to one another for punching a bumper. When the tools are open, a bumper can then be inserted into the space between the respective top tools and bottom tools.

As FIG. 1 further illustrates, a punching tool 21 (FIG. 2) is arranged with a downholder 20 at the top tool 10. The punching tool 21 can be moved downwardly in the z direction perpendicular to the workpiece plane or inclined at a small angle to the z axis in order to carry out the punching process. The downholder can be moved by positioning cylinders 22 fastened to the top tool 10.

A punch die 24 and two sonotrodes 26, 28 are attached to the bottom tool 12 for punching and welding, with this arrangement being shown in an enlarged cross-section in FIG. 2.

As FIG. 2 illustrates, the two sonotrodes 26 and 28 are rigidly fastened to the bottom tool 12, whereas the punch die 24 is fastened via a lifting device to the tool 12 by which the punch die 24 is adjustable relative to the sonotrodes 26 and 28 only in the direction of the axis z. The two sonotrodes 26 and 28 are arranged at both sides of the generally hollow-cylindrical punch die 24 and the sonotrodes are inclined at an angle of approximately 15° to the central axis of the punch die 24. The punch waste 24 can be led off to the bottom in a particularly simply manner by means of gravity due to the hollow-cylindrical formation of the punch die 24.

The punch die 24 itself has a punch attachment 30 at its upper end. In the region of the lower end, the punch die 24 is provided in one piece with a peripheral ring web which serves as a piston 32 which is guided in a cylinder 34 which is fastened to the tool 12. The punch die 24 can be moved upwardly and downwardly in the direction of the axis z by applying pressure fluid to the spaces above or below the piston 32, which is sealed via a piston seal at its outer periphery, wherein the topmost position is shown in FIG. 2 in which the punch attachment 30 can absorb the forces applied by the punching tool 21.

In this embodiment, when the tools 10 and 12 are open, a workpiece W is inserted into a workpiece mount (not shown in any more detail) so that the workpiece W is located in the position shown in FIG. 2. The punch die 24 is subsequently displaced into its upper (shown) position in that the piston 32 has pressure applied at its lower side. So that the forces are only taken up by the tool 12 in the subsequent punching process, a latch 36 is subsequently moved into a cut-out of the punch die 24 so that on exertion of a force onto the punch die 24, this force is directly introduced into the tool 12 via the latch 36. The actuation of the latch which is arranged at two sides of the punch die 24 takes place via a positioning cylinder 40 (FIG. 1) which acts transversely to the direction of the axis z.

After carrying out the punching process, the punch die 24 is either retracted or is set in the direction of the workpiece by a small pressure so that a component to be welded to the workpiece W, for example an adapter plate A is pressed toward the workpiece W and can be welded with the aid of the sonotrodes 26 and 28.

With the above-described apparatus, however, a different procedure is also possible in which the adapter plate A is first lightly pressed by the punch die 24 toward the workpiece W and is subsequently welded and wherein a punching through of the workpiece W only takes place after the welding process. The punch die 24 is here also locked with the aid of the latch 36 for the taking up of the punching forces.

FIG. 3 shows an enlarged cross-sectional view of a further embodiment of an apparatus for punching and welding plastic parts, wherein the components not recognizable in FIG. 3 (and also those in FIGS. 4-6) correspond to the embodiment of FIG. 1.

In the embodiment shown in FIG. 3, a sonotrode 46 is fastened to the bottom tool 12 and is formed as a round sonotrode, i.e. as a generally cylindrical body which is open at its upper end and has a peripheral hollow-cylindrical body whose end face serves as a weld surface. In the representation of FIG. 3, an adapter plate A is in turn placed onto the sonotrode 46 (the workpiece W is not shown here).

To take up the counter-forces arising on the punching, the sonotrode 46 shown in FIG. 3 has a punch die 44 which is connected to the sonotrode in one piece, which has the shape of a hollow cylinder and which extends up to and into the region of the weld surface.

In the embodiment of FIG. 3, the welding process is first started with the aid of the sonotrode 46 and the sonotrode acts on the adapter plate A or penetrates into the workpieces to be welded until a sufficient connection is present and the punch die 44 contacts the workpiece W (not shown in FIG. 3). In this respect, an areal weld can also take place close to the punch diameter in the region of the punch die 46 by one or more energy directors in the adapter plate. In a second workstep, an opening is then punched into the workpiece W or also into the workpiece W and into the adapter plate A. There is hereby no offset during welding and a peripheral weld can arise directly at the punched hole. A mechanical support can also be moved between the sonotrode (and the punch die connected in one piece thereto) and the bottom tool 12 to take up the punching force during the punch movement here.

An apparatus similar to FIG. 3 for punching and welding plastic parts is shown in FIG. 4. In this embodiment, the punch die 44 is not connected to the sonotrode 46 in one piece, but is rather screwed into the sonotrode 46 via a screw connection 48. The heights of these two components with respect to one another can be compensated or set by different spacers by the screw connection of the punch die 44 and the sonotrode 46. As in the embodiment of FIG. 3, welding also takes place first and subsequently punching here.

FIG. 5 shows a further embodiment of a sonotrode 46 which is fastened to the movable bottom tool 12. In this embodiment, the punch die 44 is rigidly connected to the bottom tool 12 and the sonotrode 46 is in turn configured as a round sonotrode, wherein a plurality of slits which are open toward the upper side and through which the punch die 44 can be guided are located in the upper hollow-cylindrical section of the round sonotrode. The punch die has at its upper end a hollow-cylindrical end section 45 which contacts the lower side of the adapter plate A on the punching and transfers the forces which arise directly to the bottom tool 12.

To achieve a relative movement between the punch die 44 and the sonotrode 46, the sonotrode 46 can be displaced in this embodiment relative to the punch die 44 and relative to the bottom tool 12 in the direction z. For this purpose, a cylinder section 50 is provided in the bottom tool 12 and a converter 47 of the sonotrode 46 is displaceably arranged in it. A peripheral ring web 52 is connected to the converter 47; it is sealed via a sealing ring at the outer periphery and serves as a piston. Pressure fluid can be introduced at both sides of the web 52 to move the sonotrode 46 upwardly or downwardly in the direction of the double arrow z. The sonotrode can hereby be lowered during punching so that the punching force is only taken up by the punch die 44 and the sonotrode is not loaded. For welding, the sonotrode 46 is raised and is placed at the adapter plate A with a selectable pressure. In this embodiment, the order of the method steps can be selected, i.e. welding can first take place or punching can first take place.

An embodiment of the sonotrode and of the punch die similar to FIG. 5 is shown in FIG. 6. In this embodiment, the punch die 44 and the sonotrode 46 are not fixedly connected to one another, but are adjustable in height relative to one another. The sonotrode 46 can be manually adjusted relative to the punch die 46, with the position of the punch die 44 not changing since it is fixedly connected to the bottom tool 12. In another respect, the punch die 44 is configured in the same manner as in the embodiment of FIG. 5 and is led through slits in the sonotrode which are upwardly open.

To achieve a manual adjustment of the sonotrode relative to the die without further aids, a plurality of adjustable screws 56 are provided at the lower side of the arrangement which are screwed in a lower cover and with which the lower end position of the ring web 52 and thus also of the sonotrode 46 can be set. The vertical position of the sonotrode 46 can be set with the aid of further adjustable screws 58 which are screwed in the ring web 52.

Plastic parts can be connected to one another and punched using the above-described apparatus, with welding first being able to take place and then punching or first punching being able to take place and then welding. In all cases, however, the workpieces, and in particular the main workpiece W, i.e. the bumper, remain stationary.

A movement, provided the sonotrode or the punch die are moved, takes place only in the z direction, i.e. in the stamping direction, substantially perpendicular to the surface of the main workpiece. The space requirement for the individual components is thus minimized since neither pivot movements nor lateral displacement movements are carried out. In this manner, the individual components can be arranged within the restricted space which is available within a bumper.

The invention claimed is:

1. An apparatus for punching and welding plastic parts, comprising a top tool and a bottom tool which can be set relative to one another along an axis perpendicular to a workpiece plane and also comprising at least one punch die and at least one sonotrode which are both attached either to the top tool or to the bottom tool, wherein the sonotrode is rigidly fastened to the tool; and wherein the die punch is fastened to the tool via a lifting device by means of which the punch die is adjustable relative to the sonotrode only in the direction of the axis.

2. The apparatus in accordance with claim 1, in which the lifting device can be latched to the tool via a latch.

3. The apparatus in accordance with claim 2, in which the punch die is provided with at least one cut-out into which the latch can be moved.

4. The apparatus in accordance with claim 1, in which the punch die is provided with a piston which is guided in a cylinder which is fastened to the tool or which is part of the tool.

5. The apparatus in accordance with claim 1, in which the punch die has in its interior a channel passage.

6. An apparatus for punching and welding plastic parts, comprising a top tool and a bottom tool which can be set relative to one another along an axis perpendicular to a workpiece plane and also comprising at least one punch die and at least one sonotrode which are both attached either to the top tool or to the bottom tool, wherein the die punch is rigidly fastened to the tool; and wherein the sonotrode is fastened to the tool via a lifting device by means of which the sonotrode is adjustable relative to the punch die only in the direction of the axis.

7. The apparatus in accordance claim 6 further comprising a converter for the sonotrode that is fastened to a piston which is a component of the lifting device.

8. An apparatus for punching and welding plastic parts, comprising a top tool and a bottom tool which can be set relative to one another along an axis perpendicular to a workpiece plane and also comprising at least one punch die and at least one sonotrode which are both attached either to the top tool or to the bottom tool, in which the sonotrode is rigidly fastened to the tool; and in which the punch die is rigidly fastened to the sonotrode or to the tool.

9. The apparatus in accordance with claim 8, in which the sonotrode and the punch die are connected to one another in one piece.

10. The apparatus in accordance with claim 8, in which the sonotrode and the punch die are connected to one another adjustably.

11. The apparatus in accordance with claim 8, in which the sonotrode and the punch die are fastened to the tool adjustably relative to one another.

12. The apparatus in accordance with claim 8, in which the sonotrode is substantially cylindrical; and in which the punch die is arranged in the interior of the sonotrode and is guided to the outside via openings in the sonotrode.

13. The apparatus in accordance with claim 4, in which the punch die is provided in one piece with the piston.

14. The apparatus in accordance with claim 5, in which the channel passage is downwardly open for punch waste.

15. The apparatus in accordance with claim 1, further comprising a converter for the sonotrode that is fastened to a piston which is a component of the lifting device.

16. The apparatus in accordance with claim 1, in which the sonotrode is substantially cylindrical; and in which the punch die is arranged in the interior of the sonotrode and is guided to the outside via openings in the sonotrode.

17. The apparatus in accordance with claim 6, in which the sonotrode is substantially cylindrical; and in which the punch die is arranged in the interior of the sonotrode and is guided to the outside via openings in the sonotrode.

* * * * *